US012688278B2

(12) United States Patent
Ezrielev et al.

(10) Patent No.: US 12,688,278 B2
(45) Date of Patent: Jul. 21, 2026

(54) DISCOVERY OF RANSOMWARE PROCESSES USING LAST-INTERACTED METADATA TAGGING

(71) Applicant: Dell Products L.P., Round Rock, TX (US)

(72) Inventors: Ofir Ezrielev, Be'er Sheba (IL); Yehiel Zohar, Sderot (IL); Yevgeni Gehtman, Modi'in (IL); Tomer Shachar, Beer-Sheva (IL); Maxim Balin, Gan-Yavne (IL)

(73) Assignee: Dell Products L.P., Round Rock, TX (US)

( * ) Notice: Subject to any disclaimer, the term of this patent is extended or adjusted under 35 U.S.C. 154(b) by 218 days.

(21) Appl. No.: 18/295,364

(22) Filed: Apr. 4, 2023

(65) Prior Publication Data

US 2024/0338434 A1      Oct. 10, 2024

(51) Int. Cl.
*G06F 21/54* (2013.01)
*G06F 21/55* (2013.01)
*G06F 21/56* (2013.01)

(52) U.S. Cl.
CPC ............ *G06F 21/54* (2013.01); *G06F 21/554* (2013.01); *G06F 21/566* (2013.01)

(58) Field of Classification Search
CPC ....... G06F 21/54; G06F 21/554; G06F 21/566
See application file for complete search history.

(56) References Cited

U.S. PATENT DOCUMENTS

| | | | | |
|---|---|---|---|---|
| 8,302,192 | B1 * | 10/2012 | Cnudde ................... | G06F 11/30 726/25 |
| 10,476,907 | B2 * | 11/2019 | Hittel ..................... | H04L 63/145 |
| 10,621,613 | B2 * | 4/2020 | Shiravi Khozani ......................... | G06Q 30/0248 |
| 11,792,223 | B2 * | 10/2023 | Varshney .............. | G06F 21/566 726/23 |
| 12,013,837 | B1 * | 6/2024 | Lunev .................. | G06F 16/2372 |
| 12,489,770 | B1 * | 12/2025 | Fechner ............... | G06F 21/568 |
| 2017/0060702 | A1 * | 3/2017 | Dave .................... | G06F 11/2094 |
| 2017/0140156 | A1 * | 5/2017 | Gu ....................... | G06F 11/1458 |
| 2018/0048657 | A1 * | 2/2018 | Hittel ................... | G06F 21/552 |
| 2018/0075239 | A1 * | 3/2018 | Boutnaru ............... | G06F 21/60 |
| 2019/0196981 | A1 * | 6/2019 | Silvert ............... | G06F 21/6218 |
| 2019/0205217 | A1 * | 7/2019 | Gokhale ................ | G06F 16/10 |
| 2020/0034537 | A1 * | 1/2020 | Chen ...................... | G06F 21/56 |
| 2020/0099699 | A1 * | 3/2020 | Saad ................... | G06F 11/2076 |
| 2020/0241972 | A1 * | 7/2020 | Dain ................... | G06F 16/2457 |
| 2021/0216630 | A1 * | 7/2021 | Karr .................... | H04L 63/1416 |
| 2021/0224379 | A1 * | 7/2021 | Pientka ............... | G06F 11/1464 |

(Continued)

OTHER PUBLICATIONS

Ganfure, Gaddisa Olani; Wu, Chun-Feng; Chang, Yuan-Hao; Shih, Wei-Kuan; "DeepWare: Imaging Performance Counters With Deep Learning to Detect Ransomware," IEEE Transactions on Computers, vol. 72, No. 3, Mar. 1, 2023, pp. 600-613.*

*Primary Examiner* — Victor Lesniewski
(74) *Attorney, Agent, or Firm* — Workman Nydegger

(57) ABSTRACT
One method includes tagging data with metadata that identifies a last process that interacted with the data, detecting an error that occurs when another process attempts to interact with the data that has been tagged with the metadata, in response to detecting the error, performing a query to identify the last process, and taking an action with respect to the last process. The query includes examining the metadata to identify the last process.

18 Claims, 4 Drawing Sheets

(56)        References Cited

U.S. PATENT DOCUMENTS

| | | | |
|---|---|---|---|
| 2021/0303687 A1* | 9/2021 | Pendlebury | G06F 21/6218 |
| 2021/0334374 A1* | 10/2021 | Vasudeva | G06F 21/602 |
| 2021/0409425 A1* | 12/2021 | Varshney | G06F 21/602 |
| 2022/0004632 A1* | 1/2022 | Sathyanarayana | H04L 63/1491 |
| 2022/0027472 A1* | 1/2022 | Golden | G06F 21/78 |
| 2022/0100378 A1* | 3/2022 | Borate | G06F 21/568 |
| 2022/0327208 A1* | 10/2022 | Karr | G06F 21/6218 |
| 2022/0350887 A1* | 11/2022 | Kahn | G06F 21/561 |
| 2023/0025740 A1* | 1/2023 | Beyo | G06F 21/53 |
| 2023/0084691 A1* | 3/2023 | Levy | G06F 21/6218 726/23 |
| 2023/0103474 A1* | 4/2023 | Gunda | G06F 11/1448 711/162 |
| 2023/0138346 A1* | 5/2023 | Lockton | G06F 21/53 726/23 |
| 2023/0141909 A1* | 5/2023 | Truscott | H04L 63/02 726/23 |
| 2023/0229764 A1* | 7/2023 | Vohra | G06F 21/568 |
| 2023/0289443 A1* | 9/2023 | Sinha | G06F 11/004 |
| 2023/0344860 A1* | 10/2023 | Agranonik | G06F 21/561 |
| 2023/0351015 A1* | 11/2023 | Algieri | G06F 21/561 |
| 2024/0106856 A1* | 3/2024 | Fahim | H04L 63/1425 |
| 2024/0152603 A1* | 5/2024 | Usui | G06F 21/552 |
| 2024/0259424 A1* | 8/2024 | Hyder | G06F 21/6218 |

* cited by examiner

400

Memory — 402

NVM — 404

Processor — 406

Storage Media — 408

UI Device — 410

Application(s) — 414

Data Storage — 412

DISCOVERY OF RANSOMWARE PROCESSES USING LAST-INTERACTED METADATA TAGGING

FIELD OF THE INVENTION

Embodiments of the present invention generally relate to detection of suspected ransomware. More particularly, at least some embodiments of the invention relate to systems, hardware, software, computer-readable media, and methods, for detecting suspected ransomware by generating and evaluating metadata concerning processes that have interacted with data.

BACKGROUND

Many ransomware processes include an encryption component that operates to encrypt target data. The encryption of the data prevents the data owner from using the data until a ransom is paid to the attacker, who may then provide the data owner with a key to decrypt the data. While the data owner would prefer to be able to detect, and stop, the data encryption process, it is not always possible to do so.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
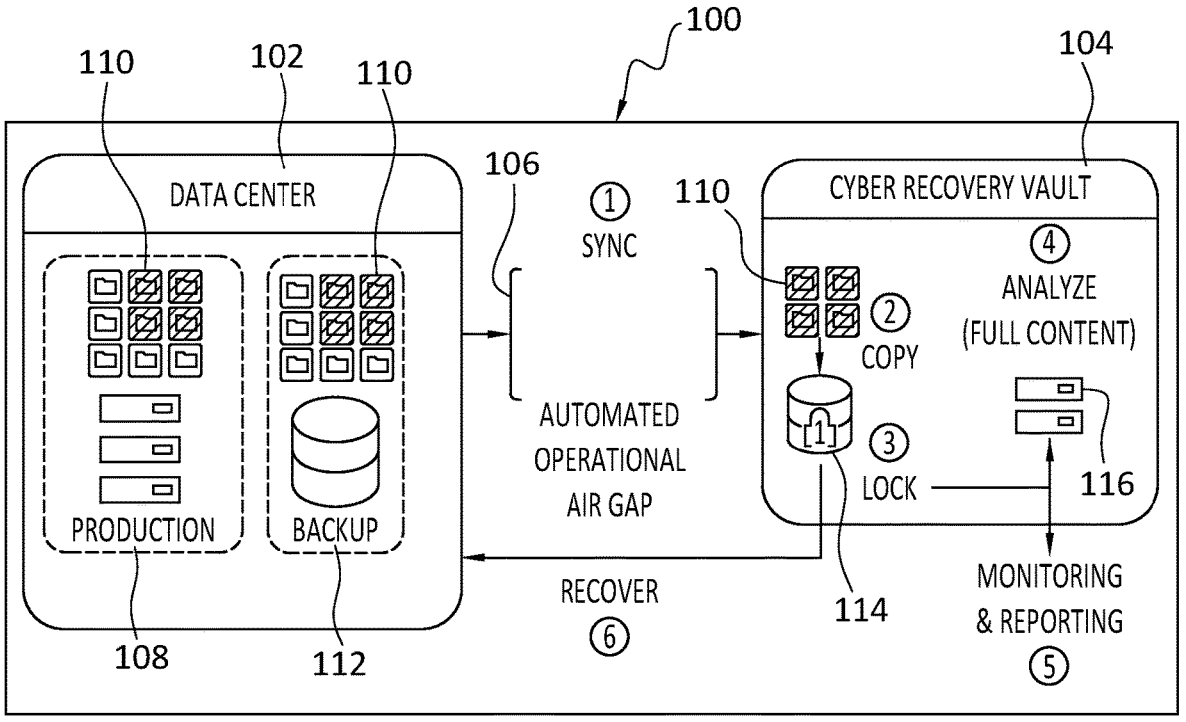
FIG. 1 discloses aspects of an example architecture and operating environment according to an embodiment.

Embodiments of the present invention generally relate to detection of suspected ransomware. More particularly, at least some embodiments of the invention relate to systems, hardware, software, computer-readable media, and methods, for detecting suspected ransomware by generating and evaluating metadata concerning processes that have interacted with data.

Data that has been encrypted by a ransomware process is likely unusable. Thus, the next process that touches such a file is likely to throw an error, and an embodiment may use this to identify the attacker. Particularly, in one embodiment, for each snapshot sent to a storage vault, metadata may be added to, or otherwise associated with, one or more files in the snapshot. In an embodiment, this metadata tagging may be implemented in/by an inode journal that may be located in the storage vault and may include an inode for each file in the vault. The metadata may include information identifying the last process, which may have been a legitimate process or a suspected ransomware process, that interacted with the file, such as by trying to write to the file for example. If the file has been encrypted by a ransomware process or other malware, an error may be raised the next time a process attempts to access the encrypted file. When such an error is raised, the vault or other storage site where the file is stored may be queried to identify the last process that interacted with the file. That is, that last process may be identified, at the vault for example, by examining the metadata that has been associated with the file. Once the process has been identified that caused the error, corresponding security analysis and countermeasures may then be implemented.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of an embodiment of the invention is that errors thrown when a process touches a file or other collection of data may be used as a mechanism to identify suspected ransomware. An embodiment may leverage the fact that encrypted data is likely to be unusable by normal production processes. Various other advantages of some example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM). Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

It is noted that as used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

With particular attention now to FIG. 1, details are provided concerning aspects of an example operating environment 100 in which example embodiments may be employed. In the illustrative, and non-limiting, example of FIG. 1, a data center 102 is configured for communication with a vault 104 to which data from the data center 102 can be backed up. The vault 104, which may take the form of a Dell CyberRecovery vault for example, may be isolated from the data center 102, except under specified conditions, by a physical air gap 106. In general, the nature of the air gap 106 is such that when the air gap 106 is in place, that is, the air gap 106 is open, there is no physical or other connection between the vault 104 and the data center 102, thus ensuring the security and integrity of any data stored in the vault 104. Security procedures may be implemented that provide for selective closing of the air gap 106, for a limited time, so that the data center 102 and the vault 104 can communicate with each other. In at least some instances, the vault 104 may control the opening and closing of the air gap 106.

The data center 102 may include a production system 108 in which data 110 is generated. Some or all of the data 110 may be backed up to, or at least accessible by way of, a namespace in a backup environment 112 of the data center 102. In an embodiment, the backups of the data 110 may comprise one or more snapshots, which may be taken on a regular basis and/or some other temporal basis, and stored in the vault 104. That is, some or all of the data 110 in the namespace of the backup environment 112 may be replicated to the vault 104. In an embodiment, the vault 104 may include, or provide, a namespace 114 configured to receive a PIT (point in time) copy of the namespace that was replicated from the backup environment 112. Finally, the vault 104 may comprise a further namespace 116, which may be referred to herein simply as a 'sandbox' or 'sandbox namespace.'

Various operations may be performed in the operating environment 100, as described hereafter. The data 110 journey may begin when it is created or modified in the production system 108 and then backed up to a namespace in the backup environment 112. A subset of the data 110, such as a group of files, in the backup environment 112 may then be replicated over (1) to the vault 104. In general, the vault 104 may serve as another backup environment, and may be air gapped, as described earlier herein. After the data 110 has landed in the vault 104 namespace, a Point In Time (PIT) copy of that namespace may be copied over (2) to another namespace in the vault 104, and the copy then retention locked (3). At this stage, the infrastructure, that is the vault 104, guarantees immutability of the data stream. Next, this locked copy of the data 110 may be copied into another namespace, or sandbox. The data in the sandbox may be subjected (4) to an analyze routine, and that data and/or sandbox may also be subjected to monitoring and reporting (5), for example to determine, and report on, an outcome of the analysis (4). The analyze routine may comprise a ML algorithm which scans the data 110 in the sandbox for malware, such as ransomware for example. If any malware is detected, that is reported. If the scan does not reveal any problems, then the sandbox, that is, the namespace to which the locked data was copied, is marked as 'deleted' once the process is complete. At some point thereafter, the data in the vault 104 may be recovered (6) to the data center 110.

B. Example Functional/Operational Aspects of an Embodiment

Figure 2:
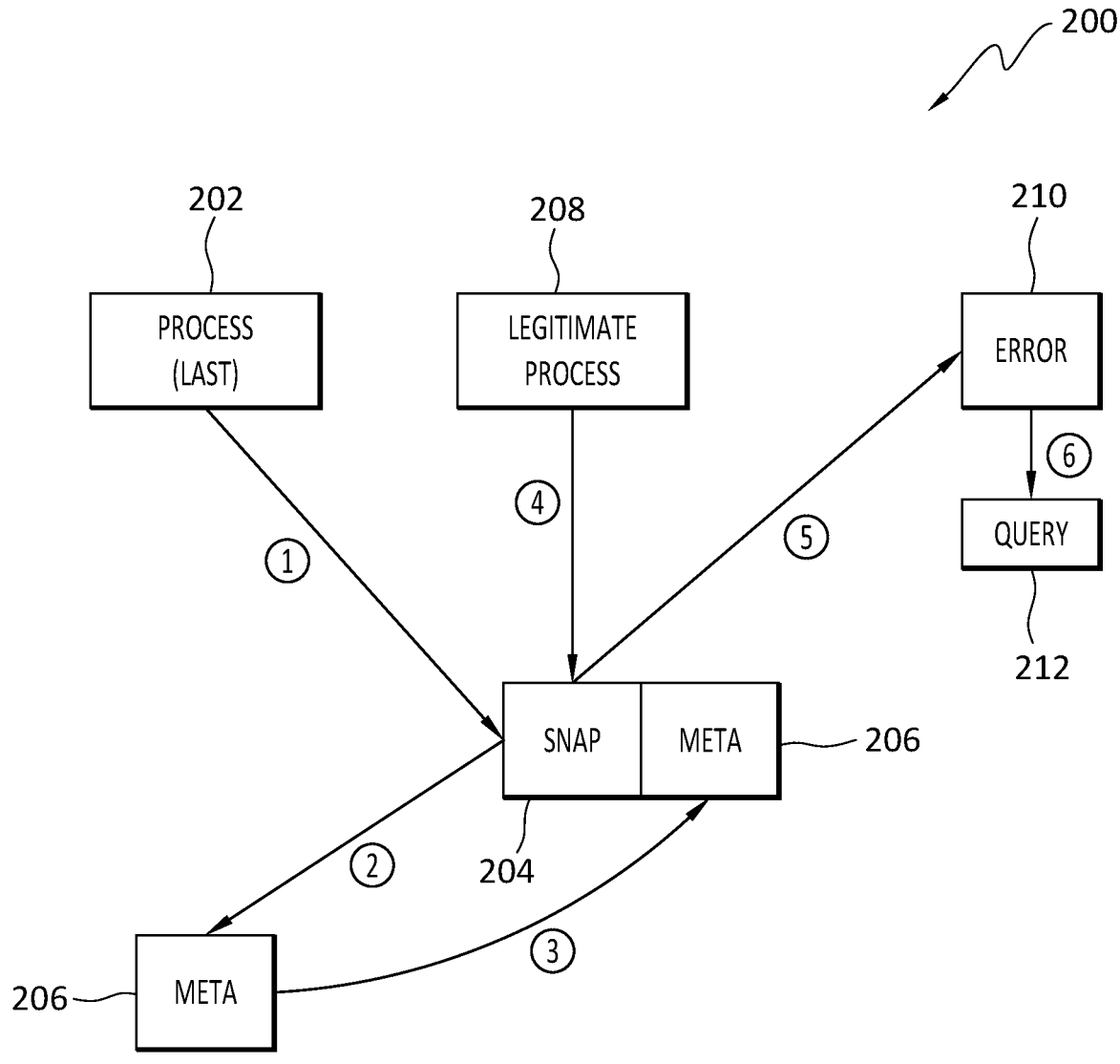
FIG. 2 discloses aspects of the functions and operation of an embodiment.

With attention now to FIG. 2, an example functional diagram 200 according to one embodiment is disclosed. As shown, a process 202 may be the last process that has interacted (1) with a file of a snapshot 204 before, for example, the snapshot 204 was sent to, or stored in, a vault or other site for storage. In an embodiment, the snapshot 204 may be sent from a production site, such as at a datacenter for example, to the vault, or other storage site.

The interaction (1) of the process 202 with the snapshot 204 may result in the generation (2) of metadata pertaining to that interaction (1). The interaction (1) may comprise, for example, a write to the file of the snapshot 204, where such a write may comprise, for example, a process that encrypts part or all of the file, and/or a process that otherwise makes the file unusable. In an embodiment, the metadata 206 may be generated automatically as a result of the interaction (1) having taken place, and/or an investigation may be performed to specifically identify the process 202 as having interacted (1) with the snapshot 204, and the metadata 206 may then be generated after the process 202 has been identified. In an embodiment, the interaction (1) may have taken place at a datacenter, such as at a production site, or backup storage, of the datacenter. As such, the process 202 may run in a datacenter.

In an embodiment, the metadata 206 may comprise, but is not limited to, an identification of the process 202, the time when the interaction (1) took place, where the interaction (1) took place, an identification of the application that performed the process 202, whether the process and/or application are known to a datacenter and/or its elements, and the nature of the process 202, for example, whether the process 202 comprises an encryption process or other process that makes the data unusable.

In any case, the file in the snapshot 204, and/or the snapshot itself, may then be tagged (3) with the metadata 206. In this way, if a problem is later experienced with the file or the snapshot 204, the metadata 206 may be examined to identify the process 202 as having been the last process that interacted (1) with the file. In one embodiment, the tagging (3) may be performed in/by an inode journal operating in a kernel space, such as at a datacenter for example.

At some point after a file has been tagged (3), a legitimate process 208, which may be running in a datacenter, for example, may attempt to interact (4) in some way with the file that was tagged with the metadata 206. Such an interaction (4) may comprise, for example, a read operation, a replication operation, or a write operation, or an attempt to perform any of these operations. In an embodiment, the interaction (4) may take place with respect to either of metadata tagged backup data residing at a storage site, such as a vault, or with respect to the data residing in a datacenter from which the backup was created. In either case, the interaction (4) may take place at a datacenter or other site where the process 208 may be running.

Thus, for example, the process 208 may attempt to retrieve, such as from a vault for example, and write to, the data residing in the vault that was tagged with the metadata 206. As another example, the process 208 may attempt to perform (4) a write operation on data residing at a datacenter. In either case, the last process 202 may be identified.

If the data, such as a file for example, that is the subject of the interaction (4) has not been compromised by the process 202, the operation(s) that comprise the interaction (4) may be successfully carried out. On the other hand however, if the data has been compromised by the process 202, an error 210 may be thrown (5) when the process 208 attempts to interact (4) with the data. Note that in some instances, an error 210 may be thrown even if the process 202 is a legitimate process, and such an error 210 in these instances may be indicative of some problem other than corruption of the data by an actual, or suspected, ransomware process. At least, however, the error 210 may provide a basis for a further investigation.

When the error 210 is raised (5), a query 212 may be performed (6) to identify the process 202 that last interacted with the data that was the subject of the interaction (4). In an embodiment, the query 212 may comprise transmitting a query identifying that data to a storage vault, or other site, where a backup of the file in question was stored. The vault or other storage site may, in response to the query 212, examine the metadata 206 that was associated with the file or other data in question. Note that in a case where the data to which the process 208 was directed is untagged data residing at a datacenter, because the identity of that data is known, the query 212 will still result in examination of the metadata 206 that relates to that data since, in the vault, a copy of that data has been tagged with the metadata 206.

When the process 202, which may comprise an actual, or suspected, ransomware process, is identified by the examination of the metadata 206, various security countermeasures and security analyses may then be carried out. In an embodiment, it may be assumed, unless/until shown otherwise, that, when the query 212 reveals the process 202 as being the last process to interact with the data, the process 202 is a ransomware process. The security countermeasures may remain in place until the process 202 no longer represents a threat. If it is determined that the process 202 is a legitimate process, and the cause of the error 210 was due to a problem with that process 202, a troubleshooting process may be performed to determine the source of, and solution to, that problem.

A security analysis of the process 202 may comprise, for example, determining the nature of the process 202, where/when the process 202 was/is operating, and identifying the other files that were last touched by the process 202. Example security countermeasures may comprise, for example, preventing further write operations by the process 202, and taking a snapshot of the process 202 to enable analysis of the process 202 in a sandbox, for example.

C. Example Methods

Figure 3:
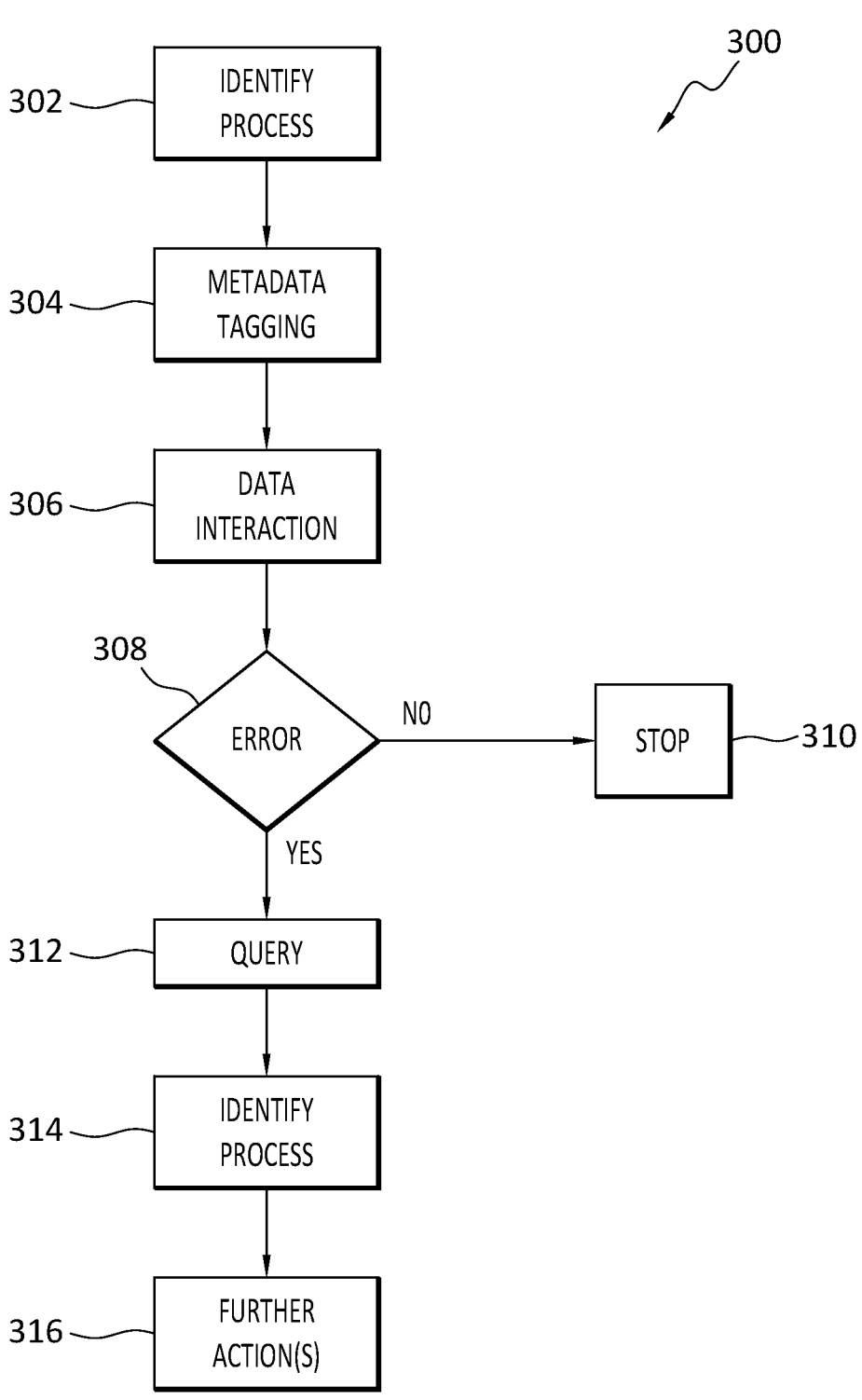
FIG. 3 discloses an example method according to one embodiment.

It is noted with respect to the disclosed methods, including the example method of FIG. 3, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 3, an example method according to one embodiment is denoted at 300. The method 300 may begin with the identification 302 of the last process that interacted with data, such as a file, in some way, such as by an actual or attempted write for example. After the process has been identified 302, the data with which the process interacted may be tagged 304 with metadata identifying that process. In an embodiment, the metadata tagging of the data may be performed at a data storage site, such as a vault for example.

At some point after the data has been tagged 304, another process, which may be running at a production site for example, may attempt to interact 306 in some way with the tagged data, a backup copy of which may reside in a vault or other storage site. The interaction 306, may comprise a read or write operation, for example. If it is determined 308 that the interaction 306 has not caused an error to be thrown, the example method 300 may terminate at 310. On the other hand, if an error is determined 308 to have been thrown as a result of the interaction 306, a query 312 may be performed.

In particular, a query 312, such as from a datacenter for example, may be directed to the storage site, such as a vault, where a copy of the data with which the interaction 306 took place, may reside. At the storage site, the metadata associated with that data may be examined, and the last process that interacted with the data identified 314 based on the examination of the metadata. Note that the process thus identified 314 may or may not actually comprise ransomware. In an embodiment, it may only be known that the interaction of the process with the data caused the error that was determined 318 to occur. Thus, at this point in the method 300, the process identified at 314 may only be a suspected ransomware process, and further investigation may have to be performed to make a definitive determination as to where, or not, that suspected ransomware process is actually a ransomware process.

Out of an abundance of caution however, various actions 316 may be taken to prevent the process from interacting with any other data unless/until such a definitive determination can be made. Thus, one such action 316 may be to deny any further write requests made by the process.

D. Further Example Embodiments

Following are some further example embodiments of the invention. These are presented only by way of example and are not intended to limit the scope of the invention in any way.

Embodiment 1. A method, comprising: tagging data with metadata that identifies a last process that interacted with the data; detecting an error that occurs when another process attempts to interact with the data that has been tagged with the metadata; in response to detecting the error, performing a query to identify the last process; and taking an action with respect to the last process.

Embodiment 2. The method as recited in any preceding embodiment, wherein the last process is identified as a suspected ransomware process.

Embodiment 3. The method as recited in any preceding embodiment, wherein the error indicates that the data was encrypted by the last process.

Embodiment 4. The method as recited in any preceding embodiment, wherein the last process runs, and/or ran, at a production site, and the tagging is performed in a vault where the data is stored, and the vault is configured for communication with the production site.

Embodiment 5. The method as recited in any preceding embodiment, wherein the metadata indicates that the last process comprises a write operation directed to the data.

Embodiment 6. The method as recited in any preceding embodiment, wherein the query comprises querying a storage site where the data is stored and examining the metadata, at the storage site, to identify the last process.

Embodiment 7. The method as recited in any preceding embodiment, wherein the tagging is performed by an inode journal.

Embodiment 8. The method as recited in any preceding embodiment, wherein the query is transmitted by a production site to a storage site where the data resides.

Embodiment 9. The method as recited in any preceding embodiment, wherein the action is taken automatically in response to identification of the last process.

Embodiment 10. The method as recited in any preceding embodiment, wherein the action comprises preventing further write operations by the last process.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

E. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
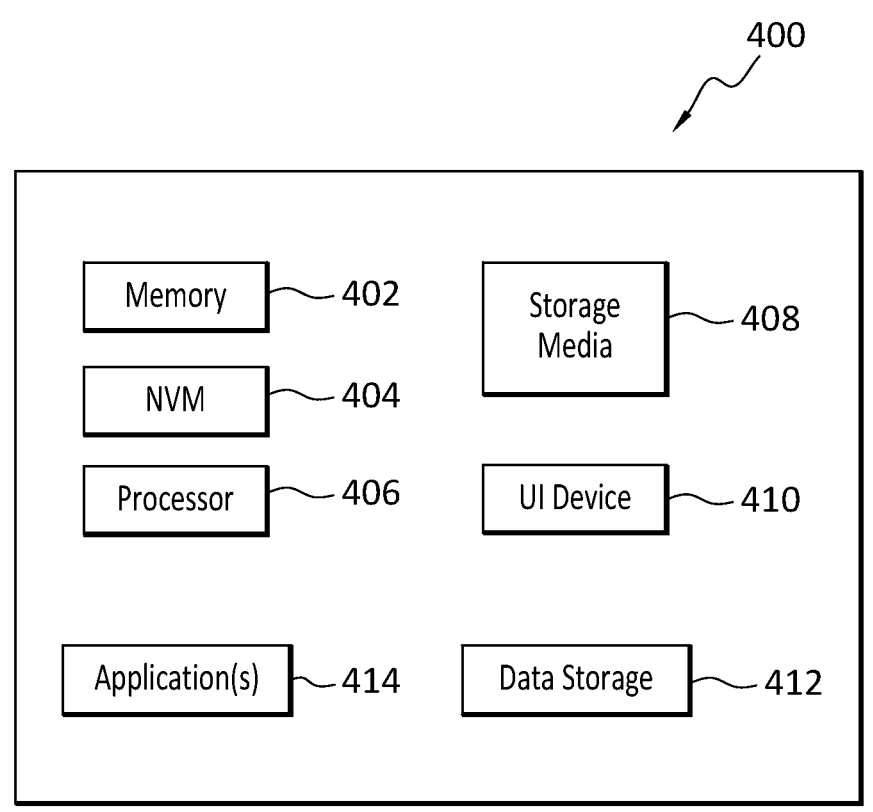
FIG. 4 discloses an example computing entity configured and operable to perform any of the disclosed methods, processes, and operations.

With reference briefly now to FIG. 4, any one or more of the entities disclosed, or implied, by FIGS. 1-3, and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

backing up data at a production site as a snapshot and locking the snapshot including the data at a storage site, wherein the storage site is air-gapped with respect to the production site, wherein an inode journal operating in a kernel space of the production site tags the snapshot with metadata about a last process that lastly interacted with the data at the production site;

copying the locked snapshot to a sandbox within the storage site, wherein the locked snapshot is analyzed for malware using a machine learning algorithm, wherein the sandbox is marked as deleted in a case where no malware is detected in the locked snapshot;

detecting an error, at the production site, in the data during an interaction with the data that was tagged in the snapshot;

in response to detecting the error, performing a query over the metadata associated with the data at the storage site to identify the last process that interacted with the data at the production site; and taking, at the production site, an action with respect to the last process.

2. The method as recited in claim 1, wherein the last process is identified as a suspected ransomware process.

3. The method as recited in claim 1, wherein the error indicates that the data was encrypted by the last process.

4. The method as recited in claim 1, wherein the storage site is configured for communication with the production site.

5. The method as recited in claim 1, wherein the metadata indicates that the last process comprises a write operation directed to the data.

6. The method as recited in claim 1, wherein the query comprises querying the storage site where the data is stored and examining the metadata, at the storage site, to identify the last process.

7. The method as recited in claim 1, wherein the query is transmitted by the production site to the storage site where the data is backed up and locked.

8. The method as recited in claim 1, wherein the action is taken automatically in response to identification of the last process.

9. The method as recited in claim 1, wherein the action comprises preventing further write operations by the last process.

10. A non-transitory storage medium having stored therein instructions that are executable by one or more hardware processors to perform operations comprising:

backing up data at a production site as a snapshot and locking the snapshot including the data at a storage site, wherein the storage site is air-gapped with respect to the production site, wherein an inode journal operating in a kernel space of the production site tags the snapshot with metadata about a last process that lastly interacted with the data at the production site;

copying the locked snapshot to a sandbox within the storage site, wherein the locked snapshot is analyzed for malware using a machine learning algorithm, wherein the sandbox is marked as deleted in a case where no malware is detected in the locked snapshot;

detecting an error, at the production site, in the data during an interaction with the data that was tagged in the snapshot;

in response to detecting the error, performing a query over the metadata associated with the data at the storage site to identify the last process that interacted with the data at the production site; and taking, at the production site, an action with respect to the last process.

11. The non-transitory storage medium as recited in claim 10, wherein the last process is identified as a suspected ransomware process.

12. The non-transitory storage medium as recited in claim 10, wherein the error indicates that the data was encrypted by the last process.

13. The non-transitory storage medium as recited in claim 10, wherein the storage site is configured for communication with the production site.

14. The non-transitory storage medium as recited in claim 10, wherein the metadata indicates that the last process comprises a write operation directed to the data.

15. The non-transitory storage medium as recited in claim 10, wherein performing the query comprises querying the storage site where the data is stored and examining the metadata, at the storage site, to identify the last process.

16. The non-transitory storage medium as recited in claim 10, wherein the query is transmitted by the production site to the storage site where the data resides.

17. The non-transitory storage medium as recited in claim 10, wherein the action is taken automatically in response to identification of the last process.

18. The non-transitory storage medium as recited in claim 10, wherein the action comprises preventing further write operations by the last process.

* * * * *